United States Patent
Tomiyoshi et al.

(10) Patent No.: US 7,595,622 B1
(45) Date of Patent: Sep. 29, 2009

(54) SYSTEM AND METHOD FOR PROVIDING A SAMPLE AND HOLD CIRCUIT FOR MAINTAINING AN OUTPUT VOLTAGE OF A CONSTANT CURRENT SOURCE CIRCUIT WHEN A FEEDBACK LOOP IS DISCONNECTED

(75) Inventors: Kenji Tomiyoshi, Mihama-ku (JP); Tatsuya Sawa, Minami-ku (JP)

(73) Assignee: National Semiconductor Corporation, Santa Clara, CA (US)

( * ) Notice: Subject to any disclaimer, the term of this patent is extended or adjusted under 35 U.S.C. 154(b) by 212 days.

(21) Appl. No.: 11/784,184

(22) Filed: Apr. 5, 2007

(51) Int. Cl.
*G05F 1/46* (2006.01)
*G05F 1/575* (2006.01)

(52) U.S. Cl. ...................... 323/285; 323/284
(58) Field of Classification Search ................ 323/271, 323/282, 284, 285, 288, 351
See application file for complete search history.

(56) References Cited

U.S. PATENT DOCUMENTS

| | | | |
|---|---|---|---|
| 6,606,257 B2 | 8/2003 | Bourdillon | |
| 6,683,419 B2 | 1/2004 | Kriparos | |
| 6,844,760 B2 | 1/2005 | Koharagi et al. | |
| 6,871,289 B2 | 3/2005 | Pullen et al. | |
| 7,058,373 B2 | 6/2006 | Grigore | |
| 7,115,888 B2 | 10/2006 | Hachiya et al. | |
| 7,132,820 B2 | 11/2006 | Walters et al. | |
| 7,388,359 B1 | 6/2008 | Ling | |
| 7,425,819 B2* | 9/2008 | Isobe | 323/222 |
| 7,443,209 B2* | 10/2008 | Chang | 327/94 |

OTHER PUBLICATIONS

"PWM LED Driver and Boost, Flyback and SEPIC Controller", Linear Technology Corporation 2005, 24 pages.
"Constant Current LED Driver with Digital and PWM Brightness Control", Texas Instruments, Nov. 2004, 25 pages.
Prathyusha Narra, et al., "An Effective LED Dimming Appraoch", 2004 IEEE, p. 1671-1676.
T. Suntio et al., "Dynamic Effects of Inductor Current Ripple in Average Current Mode Control", 2001 IEEE, pp. 1259-1264.
Zaohong Yang et al., "DC-To-DC Buck Converters with Novel Current Mode Control", 1999 IEEE, pp. 1158-1164.

* cited by examiner

*Primary Examiner*—Gary L Laxton

(57) ABSTRACT

A system and method are disclosed for maintaining an output voltage of a constant current source circuit. A constant current source circuit is provided that comprises a voltage regulator, a first feedback loop and a second feedback loop that are connected to the voltage regulator, and a sample and hold circuit that is connected to the second feedback loop. The voltage regulator regulates an output voltage VOUT to a reference voltage VREF using a first feedback voltage signal FB on the first feedback loop. The sample and hold circuit samples and holds a second feedback voltage signal VFB from the second feedback loop while the first feedback loop is connected. The voltage regulator regulates an output voltage VOUT to the second feedback reference voltage signal VFB when the first feedback loop is disconnected.

20 Claims, 7 Drawing Sheets

SYSTEM AND METHOD FOR PROVIDING A SAMPLE AND HOLD CIRCUIT FOR MAINTAINING AN OUTPUT VOLTAGE OF A CONSTANT CURRENT SOURCE CIRCUIT WHEN A FEEDBACK LOOP IS DISCONNECTED

TECHNICAL FIELD OF THE INVENTION

The present invention is generally directed to electronic circuitry and, in particular, to a system and method for providing a sample and hold circuit for maintaining an output voltage of a constant current source circuit when a feedback loop is disconnected.

BACKGROUND OF THE INVENTION

White light emitting diode (LED) circuits are commonly used in many applications because of their numerous advantages. For example, LEDs have a longer life span than other types of circuits. LEDs are also constructed of environmentally friendly materials. LEDs also have faster "turn on" times and faster "turn off" times than other types of circuits.

There are two prior art methods for adjusting the perceived brightness of LEDs. The first method is to change the magnitude of the LED driving current itself. This method, however, changes not only the perceived brightness of the LEDs but also changes the perceived color of the LEDs. The change in color is referred to as a "color shift." In many cases it is desirable to avoid the occurrence of the color shift phenomenon. When color shift is undesirable, the second method for adjusting the perceived brightness of LEDs is used. The second method does not change the magnitude of the LED driving current but keeps the magnitude of the LED driving current constant.

Therefore, constant current source circuits are commonly used in LED driver applications. One of the commonly used methods for providing a constant current source circuit utilizes a feedback loop. The feedback loop method uses a current sense resistor that is connected in series with a plurality of LED circuits in order to obtain a feedback voltage FB from the LED driving current. The feedback voltage FB is then provided to LED driver circuit through a feedback signal line. The LED driver circuit uses the feedback voltage FB to regulate the LED driving current.

For example, FIG. 1 illustrates a schematic diagram of a prior art circuit 100 for generating an output current for a plurality of light emitting diodes. An LED driver 110 is employed to provide the output current for the light emitting diodes 120. As shown in FIG. 1, the light emitting diodes 120 are connected in series. The first light emitting diode (LED) is designated with reference numeral 120a, the second LED is designated with reference numeral 120b, and so on. The last LED is designated with reference numeral 120n. The output current I(LED) that passes through the LEDS 120 also passes to ground through a sense resistor 140 (designated R1) as shown in FIG. 1. An output capacitor 150 (designated C1) has a first end connected to the VOUT terminal of LED driver 110 and has a second end connected to ground.

A voltage source 130 is connected to an ON terminal of the LED driver 110 as shown in FIG. 1. The LED driver 110 provides an output voltage VOUT to the LEDs 120 at the VOUT terminal. A feedback node FB is located between the last LED 120n and the sense resistor 140. A feedback signal from the feedback node FB is provided to the LED driver 110 to enable the LED driver 110 to regulate the value of the output voltage VOUT.

The voltage source 130 provides a pulse width modulated (PWM) input voltage signal to the LED driver 110 at the ON terminal. The duty cycle of the output current I(LED) is controlled by turning the LED driver 110 on and off.

Adjustment in the perceived brightness levels of the LEDs is made by adjusting the width of the pulses. A larger duty cycle for the output current I(LED) (i.e., wider "on" pulses) creates a higher level of perceived brightness. A smaller duty cycle for the output current I(LED) (i.e., narrower "on" pulses) creates a lower level of perceived brightness. This technique is referred to as "pulse width modulation (PWM) dimming."

The prior art circuit 100 shown in FIG. 1 provides PWM dimming for the LEDs 120. However, the rise times (and fall times) of the LED driving current I(LED) are affected by the operation of the output capacitor 150. The output capacitor 150 holds up the output voltage VOUT for a time even though the LED driver 110 is off. This means that the LED driving current I(LED) still flows until the output capacitor 150 is discharged.

This feature is illustrated in FIG. 2. The voltage source 130 is alternately turned on and off at node ON of the LED drive 110. This is shown in FIG. 2A. When the voltage at the ON node is high, then the output voltage VOUT is at its high value and the LED driving current I(LED) is at its high value. When the voltage at the ON node goes to zero, the output voltage at the VOUT node of the LED driver 110 starts to decrease. This is shown in FIG. 2B. At the same time the LED driving current I(LED) also starts to gradually decrease. This is shown in FIG. 2C. The gradual decrease in LED driving current I(LED) is shown designated with reference numeral 210 in FIG. 2C.

When the voltage at the ON node resumes its high voltage value on the next cycle, the operation of the output capacitor 150 causes it to take some time to recharge the output voltage to its maximum level. This is also shown in FIG. 2B. It also takes some time for the value of the LED driving current I(LED) to gradually increase back to its maximum value. This feature is also shown in FIG. 2C. The gradual increase in the LED driving current I(LED) is shown designated with reference numeral 220 in FIG. 2C.

For these reasons it is not possible to obtain a high pulse width modulated (PWM) dimming frequency using a prior art LED driver apparatus of the type shown in FIG. 1.

To solve the problems inherent in the prior art device shown in FIG. 1, other types of prior art LED drivers have been tried. FIG. 3 illustrates a schematic diagram of a prior art circuit 300 for generating an output current for a plurality of light emitting diodes.

An LED driver 310 is employed to provide the output current for the light emitting diodes 320. As shown in FIG. 3, the light emitting diodes 320 are connected in series. The first light emitting diode (LED) is designated with reference numeral 320a, the second LED is designated with reference numeral 320b, and so on. The last LED is designated with reference numeral 320n. The output current I(LED) that passes through the LEDs 320 also passes to ground through a sense resistor 340 (designated R3) as shown in FIG. 3. An output capacitor 350 (designated C3) has a first end connected to the VOUT terminal of LED driver 310 and has a second end connected to ground.

The LED driver 310 provides an output voltage VOUT to the LEDs 320 at the VOUT terminal. A switch 360 is coupled between the VOUT terminal of the LED driver 310 and the first LED 320a. A feedback node FB is located between the last LED 320n and the sense resistor 340. A feedback signal from the feedback node FB is provided to the LED driver 310 at the feedback terminal FB to enable the LED driver 310 to regulate the value of the output voltage VOUT. A Zener diode 370 is connected between the VOUT terminal of the LED driver 310 and the feedback node FB as shown in FIG. 3.

Prior art circuit 300 also comprises a voltage source 330 that has a first end connected to the switch 360 and that has a second end connected to ground as shown in FIG. 3. The output of the voltage source 330 is designated with the letters LED_ON. Prior art circuit 300 operates by opening and closing switch 360 to connect the voltage source 330 to the LEDs 320. This technique is able to shut off the LED driving current I(LED) in a very short time. However, this technique also breaks the feedback loop.

Zero feedback voltage causes the value of the output voltage VOUT to rise higher and higher. Furthermore, when the LED_ON output of the voltage source 330 is reconnected, the residual high values of the VOUT voltage causes the LED driving current I(LED) to overshoot. This stresses the LEDs 320 at the beginning of every ON cycle.

These features are illustrated in FIG. 4. The voltage source 330 is alternately connected through switch 360 to the LEDs 320. The result is shown in FIG. 4A. When the voltage LED_ON is high ("ON"), then (1) the output voltage VOUT is at its high value, and (2) the feedback voltage FB is at its high value, and (3) the LED driving current I(LED) is at its high value. When the LED_ON voltage goes to zero ("OFF"), then the feedback loop is broken and the feedback voltage also goes to zero. This is shown in FIG. 4B.

When the LED_ON voltage goes to zero ("OFF"), then the output voltage VOUT starts to increase. This is shown in FIG. 4C. At the same time the LED driving current I(LED) also goes to zero. This is shown in FIG. 4D.

When the LED_ON output of the voltage source 330 is reconnected, the residual high values of the VOUT voltage causes the LED driving current I(LED) to overshoot. The overshoot in the LED driving current I(LED) is shown designated with reference numeral 410 in FIG. 4D. In addition, it requires some time for the LED driving current I(LED) to settle back down from the overshoot. For these reasons it is not possible to obtain a high pulse width modulated (PWM) dimming frequency using a prior art LED driver apparatus of the type shown in FIG. 3.

Furthermore, a slow PWM dimming frequency can sometimes cause noise problems. This is due to the fact that the output voltage VOUT needs to be charged and discharged in every "on"/"off" cycle. Rapid VOUT change generates an "in rush" current from the input and causes noise from the capacitor 350. In order for the noise to be effectively reduced, the PWM dimming frequency must be higher than an audible range of frequencies.

Therefore, there is a need in the art for a system and method that is capable of maintaining an output voltage for a constant current source circuit. There is a need in the art for a system and method that is capable of regulating an output voltage of a constant current source circuit to a substantially constant value when a feedback loop of the constant current source circuit is disconnected.

An advantageous embodiment of the system and method of the present invention maintains an output voltage of a constant current source circuit. A constant current source circuit is provided that comprises a voltage regulator, a first feedback loop and a second feedback loop that are connected to the voltage regulator, and a sample and hold circuit that is connected to the second feedback loop. The voltage regulator regulates an output voltage VOUT to a reference voltage VREF using a first feedback voltage signal FB on the first feedback loop. The sample and hold circuit samples and holds a second feedback voltage signal VFB from the second feedback loop while the first feedback loop is connected. The voltage regulator regulates an output voltage VOUT to the second feedback reference voltage signal VFB when the first feedback loop is disconnected.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 5 through 11, discussed below, and the various embodiments used to describe the principles of the present invention in this patent document are by way of illustration only and should not be construed in any way to limit the scope of the invention. Those skilled in the art will understand that the principles of the present invention may be implemented with any type of suitably arranged electronic device.

Figure 5:
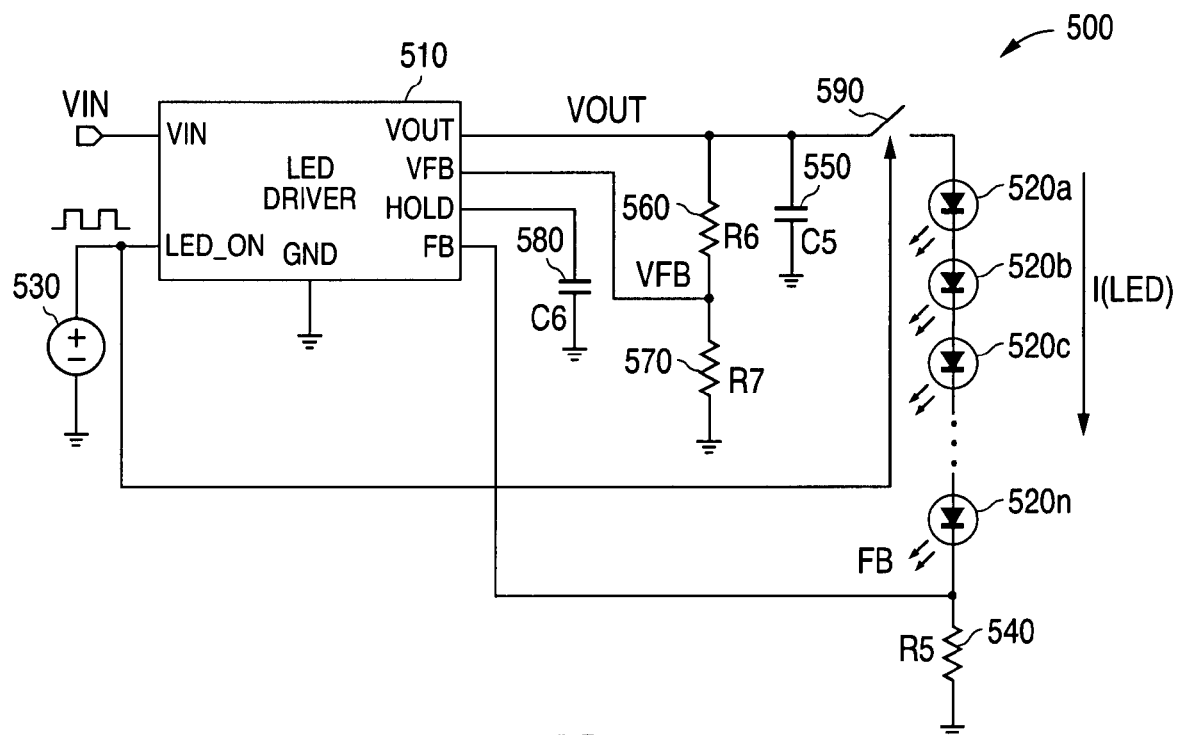
FIG. 5 illustrates a schematic diagram of a circuit for generating an output current for a plurality of light emitting diodes in accordance with the principles of the present invention.

FIG. 5 illustrates a schematic diagram of a circuit 500 for generating an output current for a plurality of light emitting diodes in accordance with the principles of the present invention. The circuit 500 of the present invention operates by keeping the output voltage VOUT in regulation during the times that the LED_ON voltage is turned off. This is accomplished by utilizing a second feedback loop and a sample and hold circuit. The sample and hold circuit samples the second feedback voltage through a resistor divider during the time that the LED_ON voltage is on. The sampled feedback voltage is held in a hold capacitor.

When the LED_ON voltage is turned off, the second feedback loop takes over and regulates the output voltage VOUT using the feedback voltage that is stored in the hold capacitor as a reference voltage. In this manner, the value of the output voltage VOUT remains constant whether the LED-ON voltage is on or off. There is no delay in charging the output capacitor. There is also no overshoot on the LED driving current. For these reasons the present invention makes it possible to create a PWM dimming frequency that is higher than the PWM dimming frequencies that can be created with prior art techniques. The present invention also makes it possible to create a PWM dimming frequency that is higher than an audible range.

As shown in FIG. 5, an output of the LED driver 510 is connected to a plurality of light emitting diodes 520. The light emitting diodes 520 are connected in series. The first LED is designated with reference numeral 520a, the second LED is designated with reference numeral 520b, and so on. The last LED is designated with reference numeral 520n. The LED driving current I(LED) that passes through the LEDs 520 also passes to ground through a sense resistor 540 (designated R5) as shown in FIG. 5. An output capacitor 550 (designated C5) has a first end connected to the VOUT terminal of LED driver 510 and has a second end connected to ground.

The LED driver 510 provides an output voltage VOUT to the LEDs 520 at the VOUT terminal. A switch 590 is coupled between the VOUT terminal of the LED driver 510 and the first LED 520a. A feedback node FB is located between the last LED 520n and the sense resistor 540. A feedback signal from the feedback node FB is provided to the LED driver 510 at the terminal FB to enable the LED driver 510 to regulate the value of the output voltage VOUT.

Circuit 500 also comprises a voltage source 530 that provides the voltage signal LED_ON to the LED_ON terminal of the LED driver 510. The voltage signal LED_ON is also provided to the switch 590. Circuit 500 also comprises a hold capacitor 580 (designated C6). A first end of the hold capacitor 580 is connected to a HOLD terminal of the LED driver 510. A second end of the hold capacitor 580 is connected to ground.

Circuit 500 also comprises a resistor divider circuit that comprises a first divider resistor 560 (designated R6) and a second divider resistor 570 (designated R7). As shown in FIG. 5, a first end of the first divider resistor 560 is connected to the VOUT terminal of the LED driver 510. A second end of the first divider resistor 560 is connected to a VFB node which is connected to a VFB terminal of the LED driver 510. A first end of the second divider resistor 570 is connected to the second end of the first divider resistor 560 at the VFB node. This means that the first end of the divider resistor 570 is connected to the VFB terminal of the LED driver 510. A second end of the second divider resistor 570 is connected to ground.

Figure 6A:
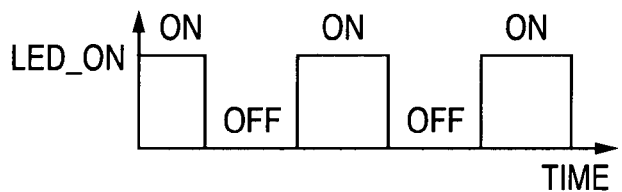
FIGS. 6A to 6F illustrate graphs of certain voltage and current signals that are observed during the operation of the circuit of the present invention that is shown in FIG. 5.
Figure 6B:
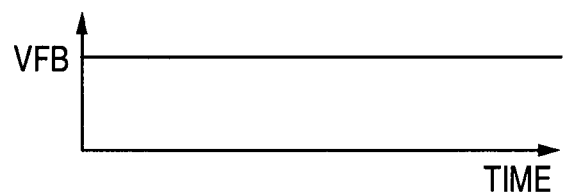
Figure 6C:
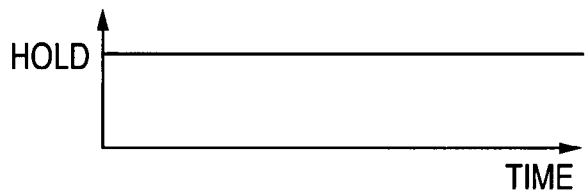

FIGS. 6A to 6F illustrate graphs of certain voltage and current signals that are observed during the operation of the circuit 500 of the present invention. The voltage source 530 is alternately connected through switch 590 to the LEDs 520. The result is shown in FIG. 6A. When the voltage LED_ON is high ("ON"), then all of the other voltages shown in FIG. 6 are at their high levels. Specifically, (1) the feedback voltage VFB is high (FIG. 6B), and (2) the hold voltage is high (FIG. 6C), and (3) the feedback voltage FB is high (FIG. 6D), and (4) the output voltage VOUT is at its high value (FIG. 6E), and (5) the LED driving current I(LED) is at its high value.

Figure 6D:
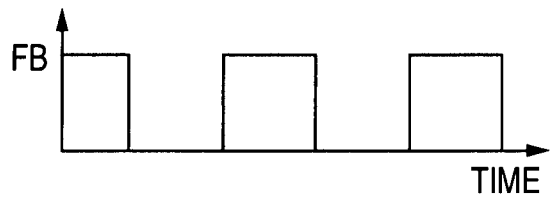
Figure 6E:
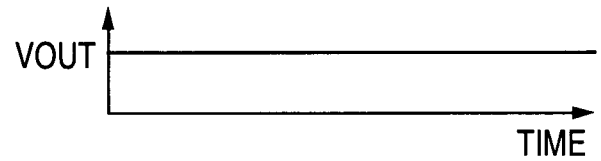
Figure 6F:
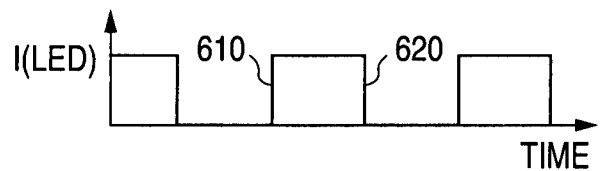

When the LED_ON voltage goes to zero ("OFF"), then the feedback loop is broken and the feedback voltage FB also goes to zero. This is shown in FIG. 6D. When the LED_ON voltage goes to zero ("OFF"), then the LED driving current I(LED) also goes to zero. This is shown in FIG. 6F. The other voltages (i.e., VFB, HOLD and VOUT) do not go to zero but keep their high values.

When the LED_ON output of the voltage source 530 is reconnected, the value of the LED driving current I(LED) quickly goes to its high value without experiencing any overshoot. This response of the LED driving current I(LED) is shown designated with reference numeral 610 in FIG. 6F. When the LED_ON output of the voltage source 530 goes to zero ("OFF"), the value of the LED driving current I(LED) quickly goes to zero. This response of the LED driving current I(LED) is shown designated with reference numeral 620 in FIG. 6F.

Figure 7:
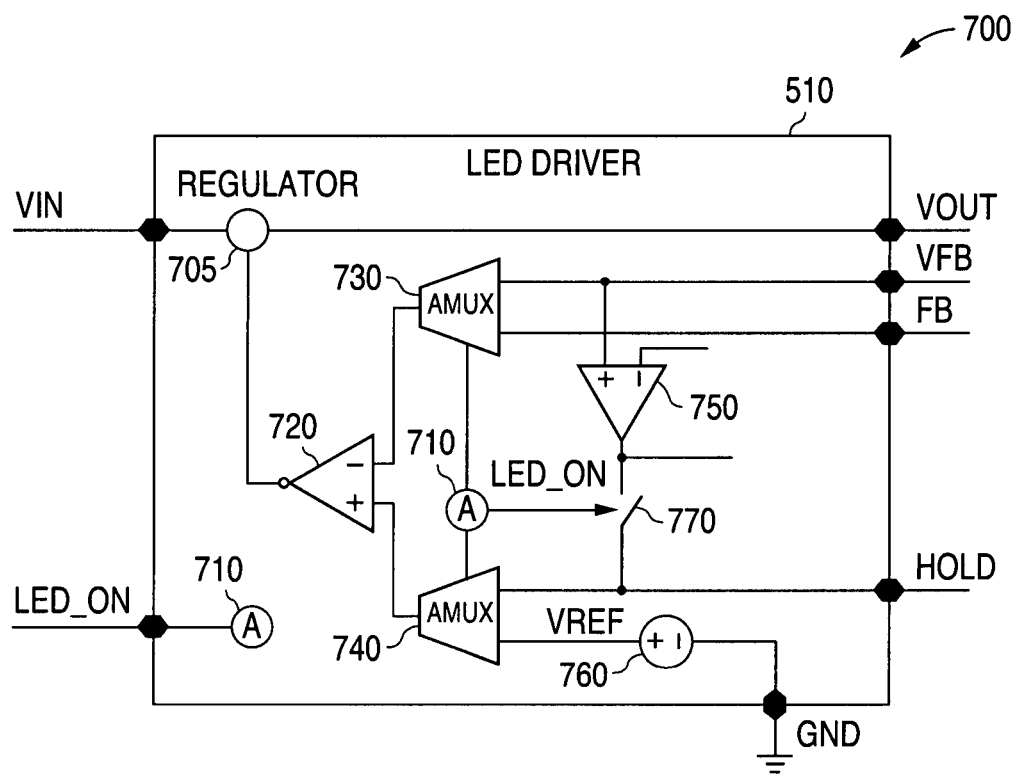
FIG. 7 illustrates a schematic diagram showing a more detailed view of an LED driver of the present invention.

FIG. 7 illustrates a schematic diagram showing a more detailed view 700 of the elements of the LED driver 510 of the present invention. LED driver 510 comprises a regulator 705, an LED_ON node 710 (designated as node A), an error amplifier 720, a first analog multiplexer (AMUX) 730, a second analog multiplexer (AMUX) 740, a buffer circuit 750, a VREF voltage reference source 760 and a switch 770, connected as shown in FIG. 7.

An input of regulator 705 is connected to the VIN terminal of the LED driver 510 and an output of regulator 705 is connected to the VOUT terminal of the LED driver 510. An output of the error amplifier 720 is connected to the regulator 705. The inputs of the error amplifier 720 are connected to the analog multiplexers, 730 and 740. The inverting input of the error amplifier 720 is connected to the output of the first analog multiplexer (AMUX) 730. The non-inverting input of the error amplifier 720 is connected to the output of the second analog multiplexer (AMUX) 740.

First analog multiplexer (AMUX) 730 has a first input connected to the VFB terminal of the LED driver 510 and has a second input connected to the FB feedback terminal of the LED driver 510. Second analog multiplexer (AMUX) 740 has a first input connected to the HOLD terminal of the LED driver 510 and has a second input connected to a first end of the VREF reference voltage source 760. A second end of the VREF reference voltage source is connected to ground through the GND terminal of the LED driver 510.

A non-inverting input of buffer circuit 750 is connected to the VFB terminal of the LED driver 510. An output of the buffer circuit 750 is connected through switch 770 to the HOLD terminal of the LED driver 510.

The LED_ON signal is provided to the LED driver 510 through the LED_ON terminal and to node A 710. The LED_ON signal on node A 710 controls the operation of the first analog multiplexer (AMUX) 730 and controls the operation of the second analog multiplexer (AMUX) 740 and controls the operation of the switch 770.

When the LED_ON signal is high (i.e., in the "ON" state) the first analog multiplexer (AMUX) 730 connects the FB feedback signal to the inverting input of error amplifier 720 and the second analog multiplexer (AMUX) 740 connects the VREF reference voltage to the non-inverting input of error amplifier 720. This causes the FB feedback signal to be regulated at the VREF reference voltage.

At the same time, the high state of the LED_ON signal (i.e., the "ON" state) at node A 710 closes switch 770. This causes the VFB signal to be sampled through the buffer circuit 750 and copied to the hold capacitor 580 through the HOLD terminal of the LED driver 510.

When the LED_ON signal is low (i.e., in the "OFF" state) (1) the first analog multiplexer (AMUX) 730 disconnects the FB feedback signal and connects the VFB feedback signal to the inverting input of error amplifier 720, and (2) the second analog multiplexer (AMUX) 740 disconnects the VREF reference voltage and connects the HOLD voltage to the non-inverting input of error amplifier 720. This keeps the VFB feedback signal in regulation at the HOLD voltage when the LED_ON signal is low. At the same time, the low state of the LED_ON signal (i.e., the "OFF" state) at node A 710 opens switch 770.

The voltage regulation that is provided by the LED driver 510 of the present invention is not limited to providing voltage regulation for light emitting diodes. The principles of the present invention may be used in any constant current source circuit. The sample and hold circuit of the present invention may be used to maintain an output voltage in any similar type of constant current source circuit when a feedback loop is disconnected.

The regulator 705 that is used in the present invention can be any type of suitable regulator circuit. The regulator 705 may be either a linear type regulator or a switching type regulator, including buck topologies, boost topologies, or buck-boost topologies.

Figure 1:
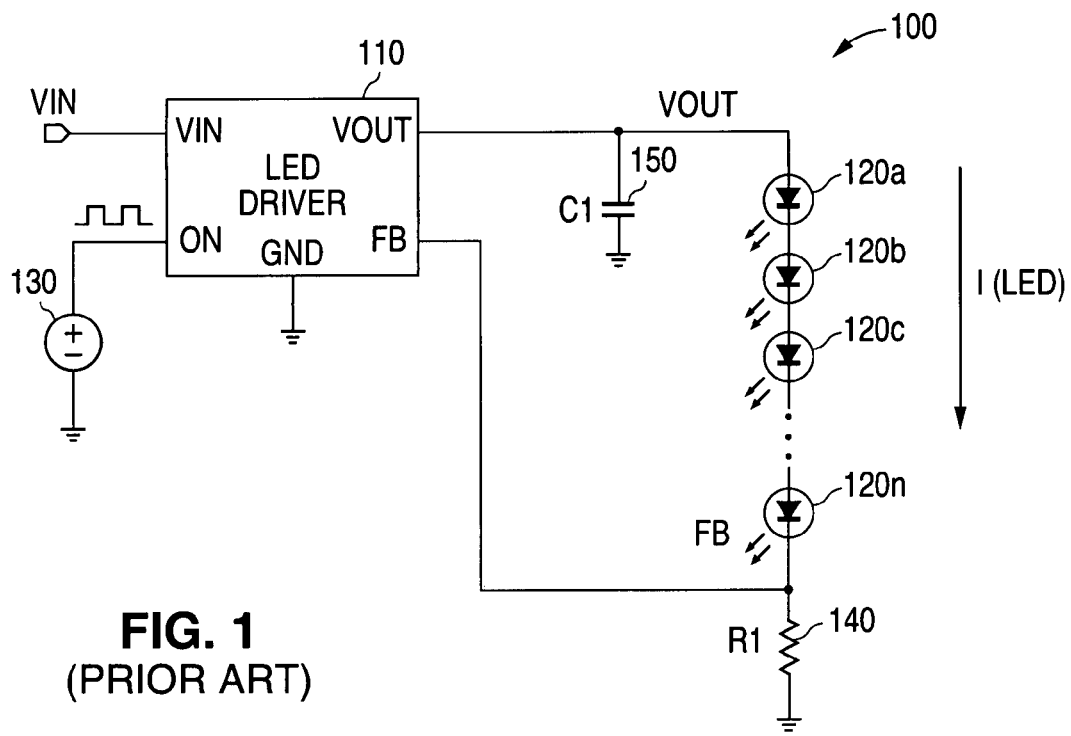
FIG. 1 illustrates a schematic diagram of a first prior art circuit for generating an output current for a plurality of light emitting diodes.
Figure 2A:
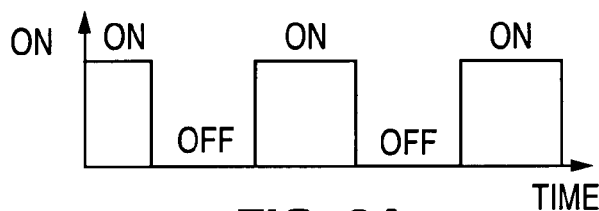
FIGS. 2A to 2C illustrate graphs of certain voltage and current signals that are observed during the operation of the first prior art circuit that is shown in FIG. 1.
Figure 2B:
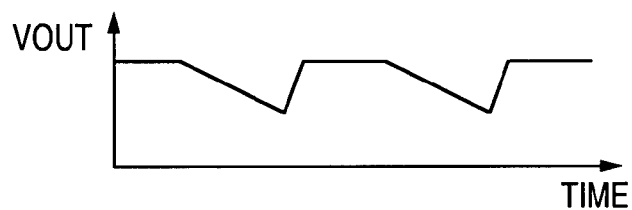
Figure 2C:
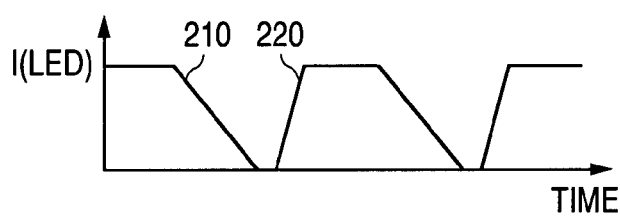
Figure 8A:
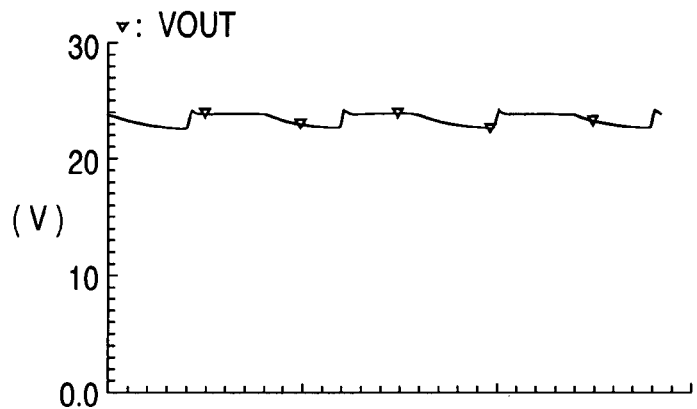
FIGS. 8A and 8B illustrate graphs of output voltage and LED driving current that are observed during the operation of the first prior art circuit that is shown in FIG. 1.
Figure 8B:
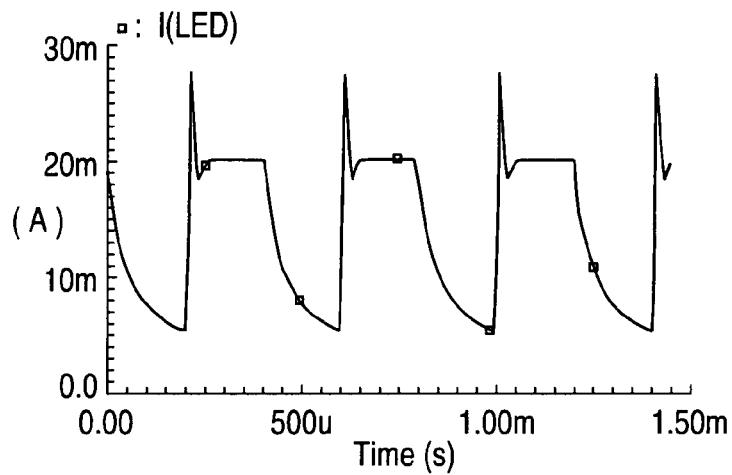

FIG. 8A illustrates a graph of the output voltage VOUT that is observed over time during the operation of the first prior art circuit 100 that is shown in FIG. 1. FIG. 8B illustrates a graph of the LED driving current I(LED) that is observed over time during the operation of the first prior art circuit 100 that is shown in FIG. 1. These graphs were obtained as a result of a simulated operation of the first prior art circuit 100 in which the PWM dimming frequency was two and one half thousand Hertz (2.5 kHz) at a fifty percent (50%) duty cycle. The LED current setting was twenty milliamperes (20 mA).

Figure 3:
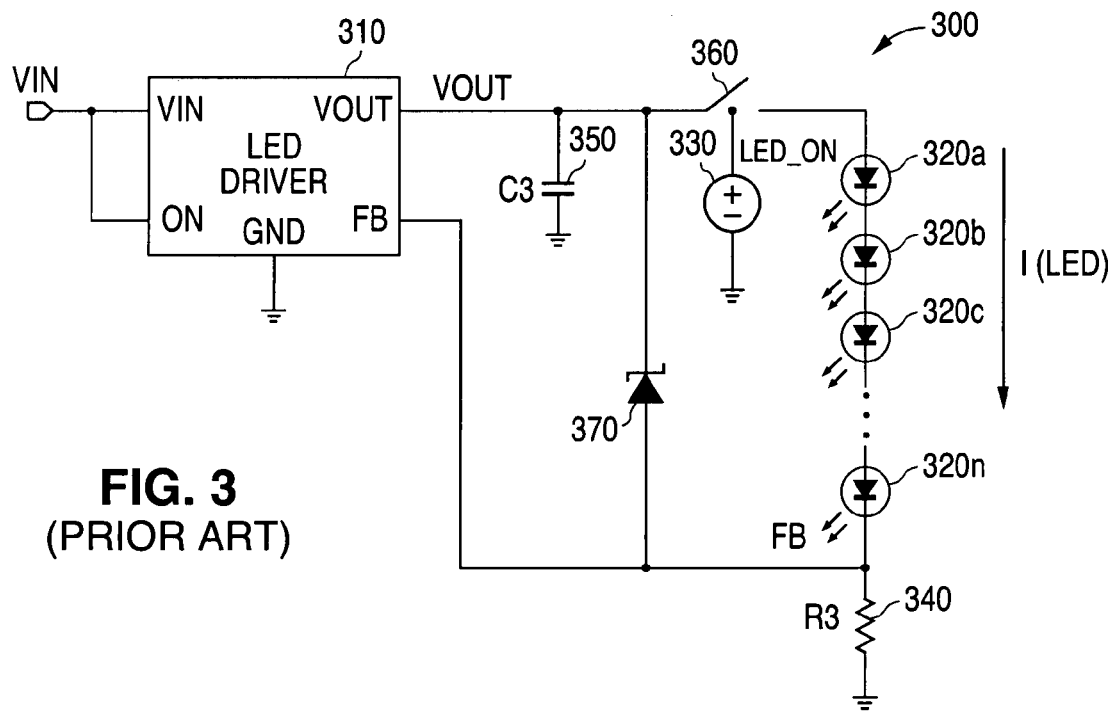
FIG. 3 illustrates a schematic diagram of a second prior art circuit for generating an output current for a plurality of light emitting diodes.
Figure 4A:
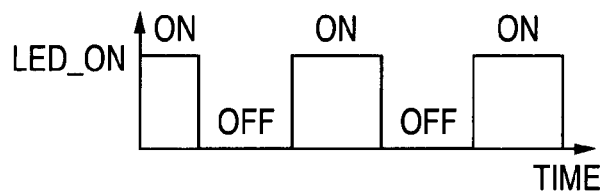
FIGS. 4A to 4D illustrate graphs of certain voltage and current signals that are observed during the operation of the second prior art circuit that is shown in FIG. 3.
Figure 4B:
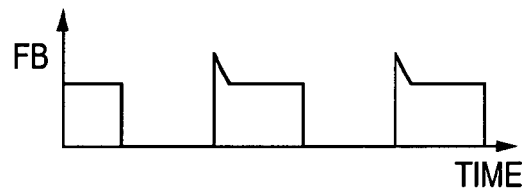
Figure 4C:
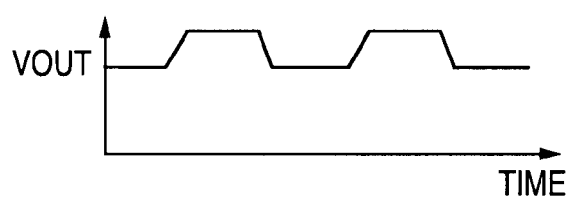
Figure 4D:
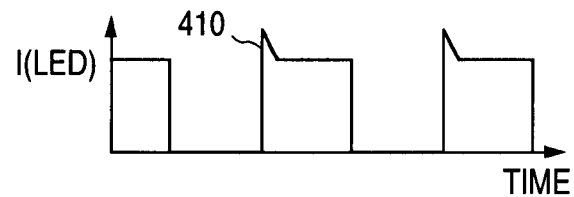
Figure 9A:
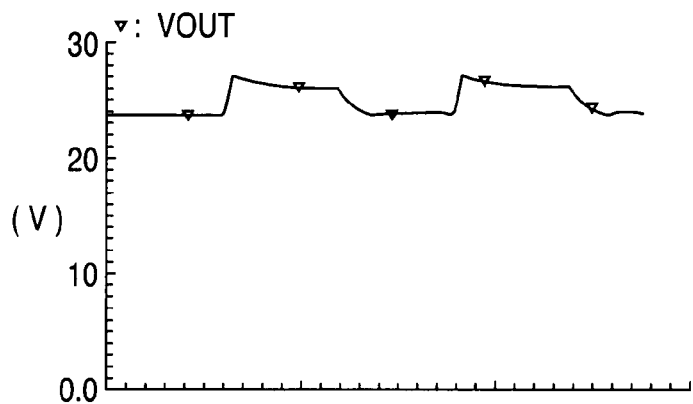
FIGS. 9A and 9B illustrate graphs of output voltage and LED driving current that are observed during the operation of the second prior art circuit that is shown in FIG. 3.
Figure 9B:
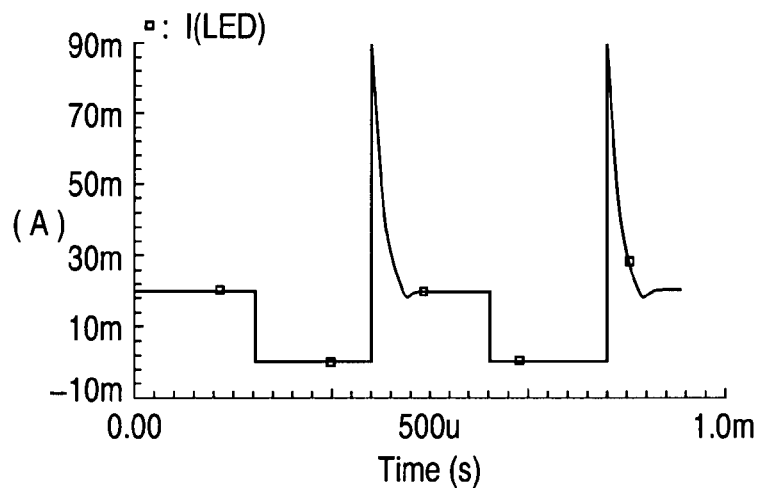

FIG. 9A illustrates a graph of the output voltage VOUT that is observed over time during the operation of the second prior art circuit 300 that is shown in FIG. 3. FIG. 9B illustrates a graph of the LED driving current I(LED) that is observed over time during the operation of the second prior art circuit 300 that is shown in FIG. 3. These graphs were obtained as a result of a simulated operation of the second prior art circuit 300 in which the PWM dimming frequency was two and one half thousand Hertz (2.5 kHz) at a fifty percent (50%) duty cycle. The LED current setting was twenty milliamperes (20 mA).

Figure 10A:
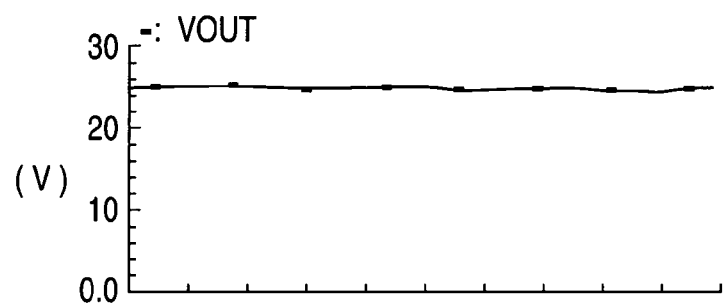
FIGS. 10A to 10C illustrate graphs of output voltage and feedback voltage and LED driving current that are observed during the operation of the circuit of the present invention that is shown in FIG. 5.
Figure 10B:
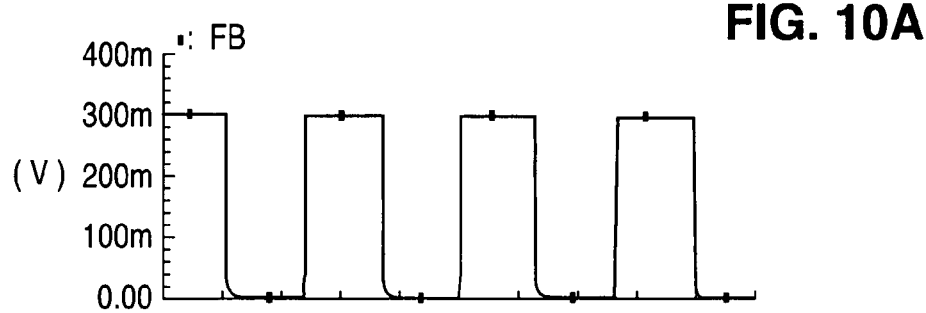
Figure 10C:
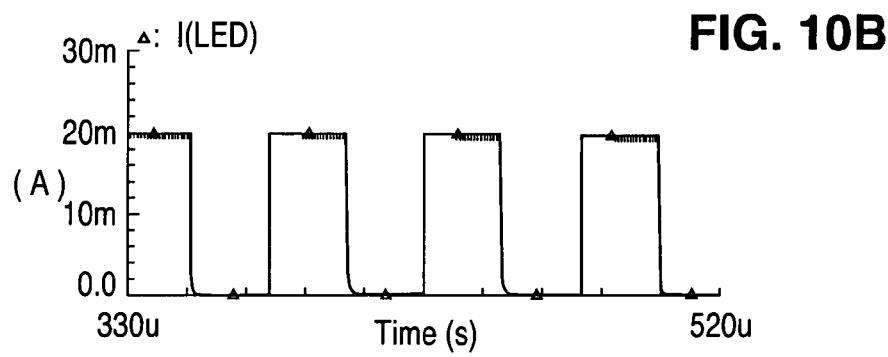

FIG. 10A illustrates a graph of the output voltage VOUT that is observed over time during the operation of the circuit 500 of the invention that is shown in FIG. 5 and in FIG. 7. FIG. 10B illustrate a graph of the feedback voltage FB that is observed over time during the operation of the circuit 500 of the invention that is shown in FIG. 5 and in FIG. 7. FIG. 10C illustrates a graph of the LED driving current I(LED) that is observed over time during the operation of the circuit 500 of the invention that is shown in FIG. 5 and in FIG. 7.

The graphs in FIGS. 10A, 10B and 10C were obtained as a result of a simulated operation of the circuit 500 of the invention in which the PWM dimming frequency was twenty thousand Hertz (20 kHz) at a fifty percent (50%) duty cycle. The LED current setting was twenty milliamperes (20 mA). Note that the twenty thousand Hertz (20 kHz) PWM dimming frequency of the invention is eight (8) times higher than the 2.5 kHz PWM dimming frequency of the prior art circuits.

The simulated operation of the circuit 500 of the invention confirms that the LED driver 510 can very quickly turn an LED current on and off. This feature is very beneficial for applications that require a high pulse width modulation (PWM) dimming frequency. The prior art LED driver circuit 100 and the prior art LED driver circuit 300 are not capable of providing a high PWM dimming frequency for LED applications.

Figure 11:
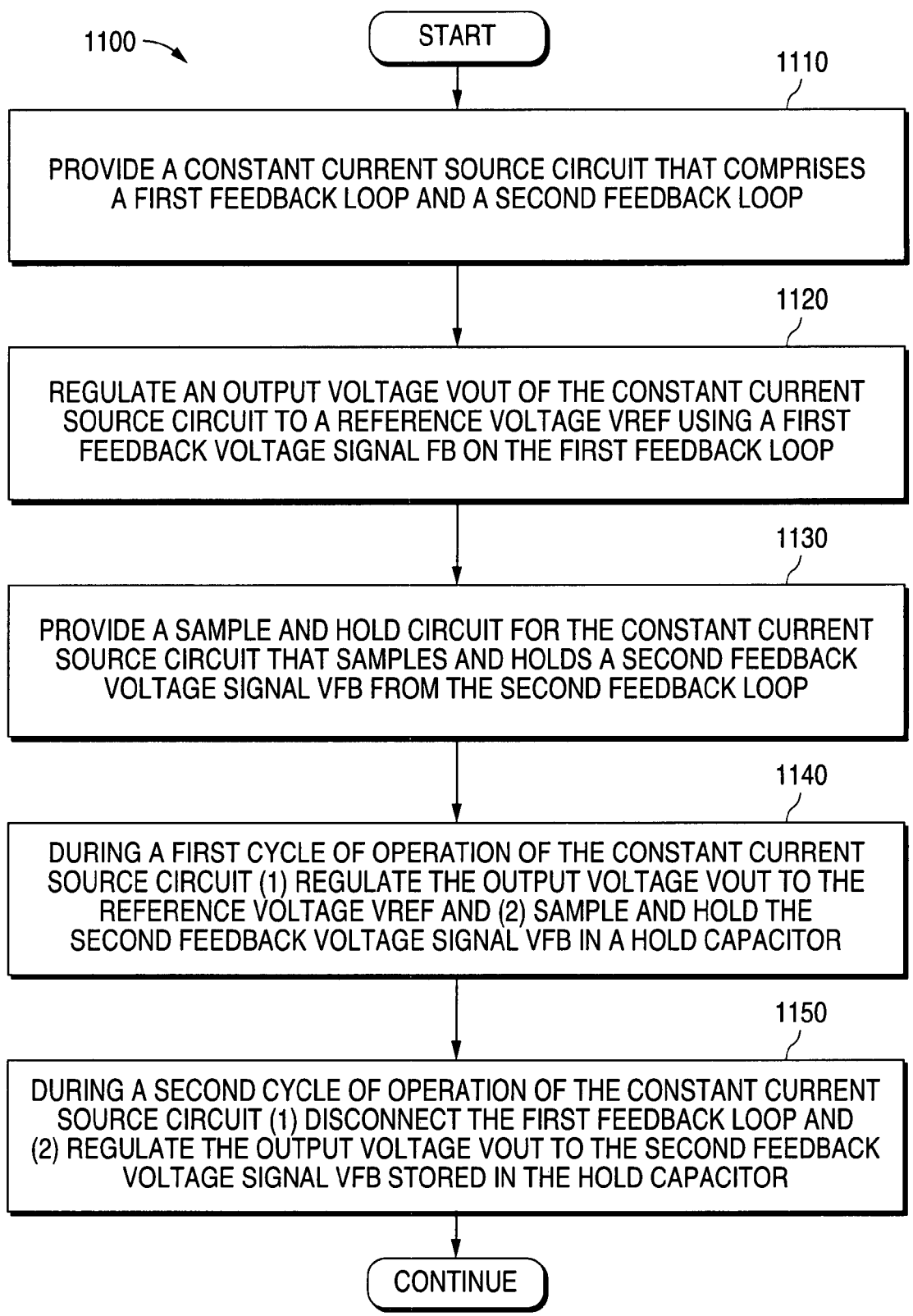
FIG. 11 illustrates a flow chart showing the steps of an advantageous embodiment of a method of the present invention.

FIG. 11 illustrates a flow chart 1100 showing the steps of an advantageous embodiment of the method of the present invention. In the first step of the method a constant current source circuit is provided that comprises a first feedback loop and a second feedback loop (step 1110). Then an output voltage VOUT of the constant current source circuit is regulated to a reference voltage VREF using a first feedback voltage signal FB on the first feedback loop (step 1120). A sample and hold circuit is provided for the constant current source circuit that samples and holds a second feedback voltage signal VFB from the second feedback loop (step 1130).

During a first cycle of operation of the constant current source circuit (1) the output voltage VOUT is regulated to the reference voltage VREF, and (2) the second feedback voltage signal VFB is sampled and held in a hold capacitor (step 1140). During a second cycle of operation of the constant current source circuit (1) the first feedback loop is disconnected, and (2) the output voltage VOUT is regulated to the second feedback voltage signal VFB stored in the hold capacitor (step 1150).

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. A constant current source circuit comprising:
   a voltage regulator;
   a first feedback loop;
   a second feedback loop;
   a sample and hold circuit selectively connected to the second feedback loop;
   an error amplifier having an output connected to the voltage regulator;
   a first multiplexer having inputs connected to the first and second feedback loops and an output connected to a first input of the error amplifier; and
   a second multiplexer having an output connected to a second input of the error amplifier.

2. The constant current source circuit as claimed in claim 1, wherein the voltage regulator is configured to regulate an output voltage to a reference voltage based on a first feedback voltage signal from the first feedback loop.

3. The constant current source circuit as claimed in claim 2, wherein the sample and hold circuit is configured to sample and hold a second feedback voltage signal from the second feedback loop while the first feedback loop is connected to the error amplifier.

4. The constant current source circuit as claimed in claim 3, wherein the voltage regulator is configured to regulate the output voltage to the second feedback voltage signal when the first feedback loop is disconnected from the error amplifier.

5. The constant current source circuit as claimed in claim 1, wherein the first multiplexer is configured to selectively connect one of the first and second feedback loops to the error amplifier; and
wherein the second multiplexer is configured to (i) connect a reference voltage source to the error amplifier when the first feedback loop is connected to the error amplifier and (ii) connect the sample and hold circuit to the error amplifier when the second feedback loop is connected to the error amplifier.

6. The constant current source circuit as claimed in claim 1, wherein the inputs of the first multiplexer comprise a first input connected to the first feedback loop and comprises a second input connected to the second feedback loop.

7. The constant current source circuit as claimed in claim 1, wherein the second multiplexer comprises a first input connected to a hold capacitor of the sample and hold circuit and a second input connected to a reference voltage source.

8. The constant current source circuit as claimed in claim 1, wherein an operation of the first multiplexer and an operation of the second multiplexer are controlled by a control signal.

9. The constant current source circuit as claimed in claim 8, wherein the first multiplexer is configured to provide a feedback voltage signal from the first feedback loop to the error amplifier in response to a high level of the control signal; and
wherein the second multiplexer is configured to provide a reference voltage signal to the error amplifier in response to the high level of the control signal.

10. The constant current source circuit as claimed in claim 8, wherein the first multiplexer is configured to provide a feedback voltage signal from the second feedback loop to the error amplifier in response to a low level of the control signal; and
wherein the second multiplexer is configured to provide a voltage signal stored in a hold capacitor of the sample and hold circuit to the error amplifier in response to the low level of the control signal.

11. The constant current source circuit as claimed in claim 10, further comprising:
a buffer circuit having an input configured to receive the feedback voltage signal from the second feedback loop; and
a switch having a first end connected to an output of the buffer circuit and having a second end connected to the hold capacitor of the sample and hold circuit.

12. The constant current source circuit as claimed in claim 11, wherein the switch is controlled by the control signal.

13. A method for maintaining an output voltage of a constant current source circuit, the method comprising:
selectively connecting one of a first feedback loop and a second feedback loop to an error amplifier;
sampling and holding a feedback voltage from the second feedback loop when the first feedback loop is connected to the error amplifier;
selectively providing one of a reference voltage and the feedback voltage to the error amplifier; and
regulating the output voltage of the constant current source circuit using a voltage regulator, the output voltage regulated based on an output of the error amplifier.

14. The method as claimed in claim 13, wherein regulating the output voltage of the constant current source circuit comprises:
regulating the output voltage of the constant current source circuit to the reference voltage when the first feedback loop is connected to the error amplifier and the reference voltage is provided to the error amplifier.

15. The method as claimed in claim 13, wherein sampling and holding the feedback voltage comprises:
sampling and holding the feedback voltage from the second feedback loop using a hold capacitor.

16. The method as claimed in claim 15, wherein regulating the output voltage of the constant current source circuit comprises:
regulating the output voltage of the constant current source circuit to the feedback voltage stored in the hold capacitor when the second feedback loop is connected to the error amplifier and the feedback voltage is provided to the error amplifier.

17. An apparatus comprising:
a voltage regulator configured to regulate an output voltage;
an error amplifier having an output connected to the voltage regulator;
a first multiplexer having (i) inputs configured to be connected to first and second feedback loops associated with the output voltage and (ii) an output connected to a first input of the error amplifier; and
a second multiplexer having (i) inputs configured to be connected to a reference voltage source and to a sample and hold circuit and (ii) an output connected to a second input of the error amplifier.

18. The apparatus as claimed in claim 17, wherein:
the voltage regulator is configured to regulate the output voltage to a reference voltage from the reference voltage source when the first feedback loop is connected to the first input of the error amplifier by the first multiplexer and the reference voltage source is connected to the second input of the error amplifier by the second multiplexer; and
further comprising a buffer connected to the second feedback loop and a switch configured to selectively connect the buffer to the sample and hold circuit when the first feedback loop is connected to the first input of the error amplifier by the first multiplexer.

19. The apparatus as claimed in claim 17, wherein:
the voltage regulator is configured to regulate the output voltage to a feedback voltage from the sample and hold circuit when the second feedback loop is connected to the first input of the error amplifier by the first multiplexer and the sample and hold circuit is connected to the second input of the error amplifier by the second multiplexer.

20. The apparatus as claimed in claim 17, wherein:
the voltage regulator is configured to regulate the output voltage to a substantially constant value whether or not the first feedback loop is connected to the first input of the error amplifier by the first multiplexer.

* * * * *